(12) United States Patent
Kang

(10) Patent No.: US 11,858,449 B2
(45) Date of Patent: Jan. 2, 2024

(54) CURTAIN AIRBAG

(71) Applicant: HYUNDAI MOBIS CO., LTD., Seoul (KR)

(72) Inventor: Dong Ho Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/662,398

(22) Filed: May 6, 2022

(65) Prior Publication Data

US 2022/0388469 A1 Dec. 8, 2022

(30) Foreign Application Priority Data

Jun. 3, 2021 (KR) .................. 10-2021-0072218

(51) Int. Cl.
B60R 21/232 (2011.01)
B60R 21/237 (2006.01)
B60R 21/213 (2011.01)
B60R 21/233 (2006.01)
B60R 21/16 (2006.01)

(52) U.S. Cl.
CPC .......... B60R 21/232 (2013.01); B60R 21/213 (2013.01); B60R 21/233 (2013.01); B60R 21/237 (2013.01); B60R 2021/161 (2013.01); B60R 2021/23308 (2013.01)

(58) Field of Classification Search
CPC ... B60R 21/232; B60R 21/237; B60R 21/213; B60R 21/233; B60R 21/23138; B60R 21/231; B60R 21/2334; B60R 2021/23308; B60R 2021/161

USPC .................. 280/729, 730.2, 743.1
See application file for complete search history.

(56) References Cited

U.S. PATENT DOCUMENTS

| 7,185,914 B2 * | 3/2007 | Recker .................. B60R 21/232 |
| | | 280/730.2 |
| 8,414,021 B2 * | 4/2013 | Tanaka ................ B60R 21/2334 |
| | | 280/730.2 |
| 9,963,102 B1 * | 5/2018 | Ballam ................. B60R 21/237 |
| 11,254,279 B2 * | 2/2022 | Lee ....................... B60R 21/213 |

(Continued)

FOREIGN PATENT DOCUMENTS

DE 202020101968 U1 * 6/2020 .......... B60R 21/201
JP 2015013558 A * 1/2015

(Continued)

OTHER PUBLICATIONS

Definition of "outboard"; https://www.thefreedictionary.com/outboard; Sep. 29, 2022.*

(Continued)

*Primary Examiner* — Keith J Frisby
(74) *Attorney, Agent, or Firm* — DLA PIPER LLP (US)

(57) ABSTRACT

A curtain airbag capable of improving deployability of an airbag cushion without including a ramp component. The curtain airbag includes a main cushion, provided at an upper side of a pillar of a vehicle along a forward-and-rearward direction of the vehicle and configured to be deployed with inflation thereof, and a guide cushion, connected to a front area of an upper end portion of the main cushion and configured to extend toward a rear of the vehicle, the guide cushion pushing the main cushion toward an inside of the vehicle while being inflated together with the main cushion.

4 Claims, 10 Drawing Sheets

(56) References Cited

U.S. PATENT DOCUMENTS

| | | | | |
|---|---|---|---|---|
| 11,597,344 B2* | 3/2023 | Lee | ................... | B60R 21/2346 |
| 2004/0007857 A1* | 1/2004 | Sonnenberg | .......... | B60R 21/232 |
| | | | | 280/730.2 |
| 2006/0157958 A1* | 7/2006 | Heudorfer | ........... | B60R 21/2338 |
| | | | | 280/730.2 |
| 2007/0296189 A1* | 12/2007 | Berntsson | ............. | B60R 21/232 |
| | | | | 280/730.2 |
| 2008/0012275 A1* | 1/2008 | Pinsenschaum | ........ | B60R 21/26 |
| | | | | 280/730.2 |
| 2010/0013198 A1* | 1/2010 | Karlsson | ............... | B60R 21/214 |
| | | | | 280/728.2 |
| 2010/0264630 A1* | 10/2010 | Walston | ................ | B60R 21/213 |
| | | | | 280/730.2 |
| 2011/0079990 A1* | 4/2011 | Cheal | ................... | B60R 21/233 |
| | | | | 280/730.2 |
| 2011/0101659 A1* | 5/2011 | Nogami | ................ | B60R 21/213 |
| | | | | 280/730.2 |
| 2012/0200071 A1* | 8/2012 | Trevena | ................ | B60R 21/232 |
| | | | | 280/730.2 |
| 2012/0286499 A1* | 11/2012 | Wiik | ................... | B60R 21/2334 |
| | | | | 280/730.2 |
| 2014/0239621 A1* | 8/2014 | Kawamura | ........... | B60R 21/232 |
| | | | | 280/730.2 |
| 2018/0065588 A1* | 3/2018 | Lee | ....................... | B60R 21/232 |
| 2020/0156585 A1* | 5/2020 | Yoo | .................... | B60R 21/2346 |
| 2021/0061214 A1* | 3/2021 | Kim | .................... | B60R 21/237 |
| 2022/0340097 A1* | 10/2022 | Lee | .................... | B60R 21/2346 |

FOREIGN PATENT DOCUMENTS

| | | | | | |
|---|---|---|---|---|---|
| KR | 100656618 B1 | * | 12/2006 | | |
| KR | 20180000402 A | * | 1/2018 | | |
| KR | 2021-0010049 | | 1/2021 | | |
| KR | 20210010049 A | * | 1/2021 | | |
| WO | WO-2018066842 A1 | * | 4/2018 | ............... | B60Q 3/51 |

OTHER PUBLICATIONS

Extended European Search Report dated Nov. 10, 2022 issued in EP 22175259.5.

* cited by examiner

Prior Art

Prior Art

Prior Art

CURTAIN AIRBAG

CROSS-REFERENCE TO THE RELATED APPLICATION

This application claims priority from Korean Patent Application No. 10-2021-0072218, filed on Jun. 3, 2021, in the Korean Intellectual Property Office, the disclosure of which is incorporated herein by reference in its entirety.

BACKGROUND OF THE INVENTION

Field of the Invention

The present invention relates to a curtain airbag, and more particularly to a curtain airbag that improves the deployability of an airbag cushion without including a ramp component.

Description of the Related Art

In general, a curtain airbag device is a device that protects a passenger from a side impact in the event of an accident.

A curtain airbag is disposed at an upper portion of a front door and a rear door of a vehicle and is oriented in a forward-and-rearward direction of a vehicle body. For example, the curtain airbag is normally stored in a folded state inside a side inner panel disposed in an upper portion of an A-pillar and a C-pillar of the vehicle. In addition, when a collision signal is detected by a sensor when a collision of the vehicle occurs, gas is supplied to an airbag cushion forming the curtain airbag through an inflator. Accordingly, when the airbag cushion is deployed downwards, a side portion of the passenger is protected from the impact of the vehicle.

FIG. 1A is a view showing the state in which a general curtain airbag is stored, FIG. 1B is a view showing the state in which the general curtain airbag is deployed, and FIG. 1C is a view showing the process whereby the general curtain airbag is deployed.

As shown in FIGS. 1A to 1C, the general curtain airbag is stored in a space surrounded by an outboard member 50, a headliner 52, and a trim 51 of the vehicle while an airbag cushion 10 is in a folded state. In this case, the airbag cushion 10 is mounted on the outboard member 50 by a plurality of mounting tabs 11. Further, an inflator 20 is mounted on the airbag cushion 10, and gas is supplied to an inside of the airbag cushion 10 by operation of the inflator 20, thereby inflating and deploying the same.

Particularly, in the related art, in order to prevent the airbag cushion 10 from interfering with an end portion of the trim 51 during the deployment thereof, a ramp (ramp 30) configured to guide the airbag cushion 10 to be deployed toward an inside of the vehicle is separately manufactured and disposed between the airbag cushion 10 and the outboard member 50.

As described above, in the case of the curtain airbag of the related art, in order to allow the airbag cushion 10 to be deployed without interfering with the end portion of the trim 51, the ramp 30, which is a separate injection-molded plastic product, is additionally disposed therebetween, which causes a problem of increased manufacturing costs and labor for assembly.

The information disclosed in this Background of the Invention section is only for enhancement of understanding of the general background of the invention, and should not be taken as an acknowledgement or any form of suggestion that this information forms the related art already known to a person skilled in the art.

SUMMARY OF THE INVENTION

Therefore, the present invention has been made in view of the above problems, and it is an object of the present invention to provide a curtain airbag capable of improving deployability of an airbag cushion without including a ramp component, which is a separate injection-molded plastic product.

In accordance with the present invention, the above and other objects can be accomplished by the provision of a curtain airbag including a main cushion provided at an upper side of a pillar of a vehicle along a forward-and-rearward direction of the vehicle and configured to be deployed by inflation thereof, and a guide cushion connected to a front area of an upper end portion of the main cushion and configured to extend toward a rear of the vehicle, the guide cushion pushing the main cushion toward an inside of the vehicle while being inflated together with the main cushion.

The guide cushion may be divided into a primary deployment area connected to the main cushion and configured to be deployed toward an outboard member of the vehicle to push the main cushion toward the inside of the vehicle, and a secondary deployment area configured to extend from the primary deployment area and to be deployed between an end portion of a trim and the main cushion to push the main cushion so as to avoid contact with the end portion of the trim.

The primary deployment area of the guide cushion may be deployed earlier than the secondary deployment area thereof.

A mounting hole including an inflator mounted therein may be formed in the primary deployment area of the guide cushion, and the main cushion and the guide cushion may communicate with each other at a portion adjacent to the mounting hole, and gas ejected from the inflator may flow to the main cushion and the primary deployment area of the guide cushion while being distributed thereto.

The communication area where the main cushion and the guide cushion communicate with each other may be an area corresponding to an area where a B-pillar of the vehicle is located, or may be formed ahead of the area toward a front side of the vehicle.

The main cushion may be folded in a roll shape, and the guide cushion may be folded around the main cushion in a shape surrounding an outside of the main cushion.

The guide cushion may have an end portion thereof folded inwards toward the main cushion.

The guide cushion may have an end portion thereof folded toward the inside of the vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, embodiments of the present invention will be described in more detail with reference to the accompanying drawings. However, the present invention is not limited to the embodiments disclosed below, but will be implemented in various different forms. The embodiments are provided to ensure that the disclosure of the present invention is complete and to fully inform a person having ordinary skill in the art of the scope of the invention. Wherever possible, the same reference numbers will be used throughout the drawings to refer to the same or like parts.

Figure 1A:
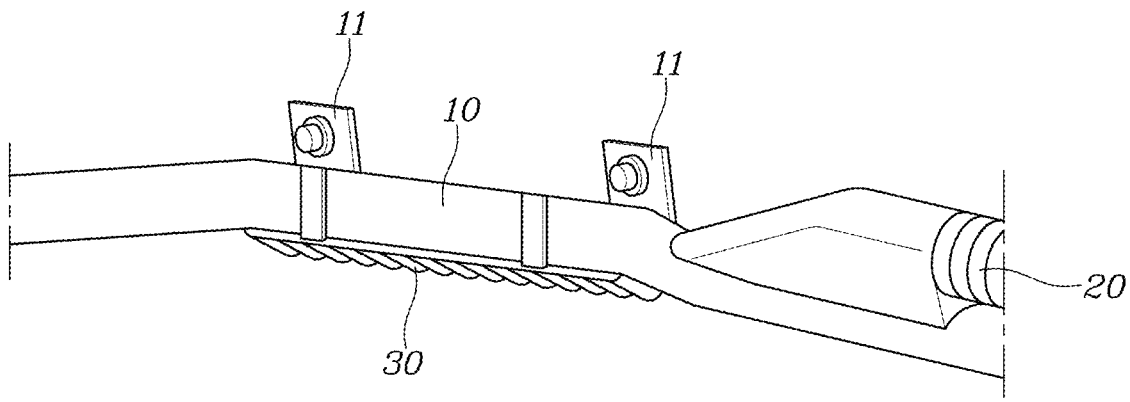
FIG. 1A is a view showing the state in which a general curtain airbag is stored.
Figure 1A:
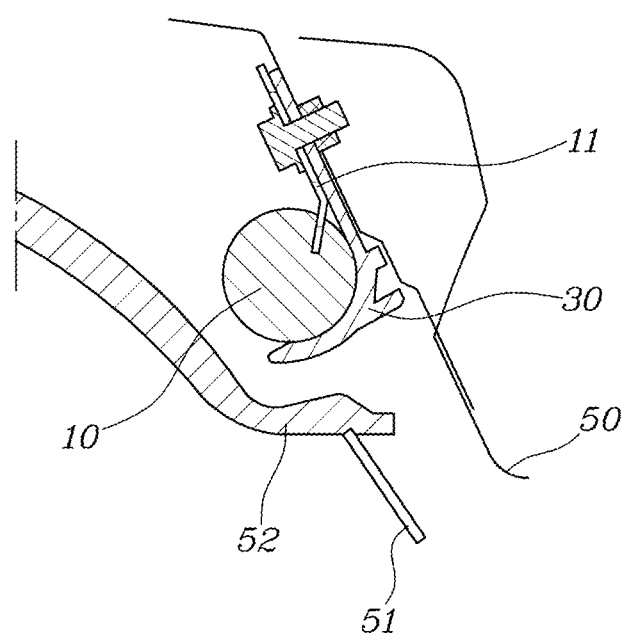
Figure 1B:
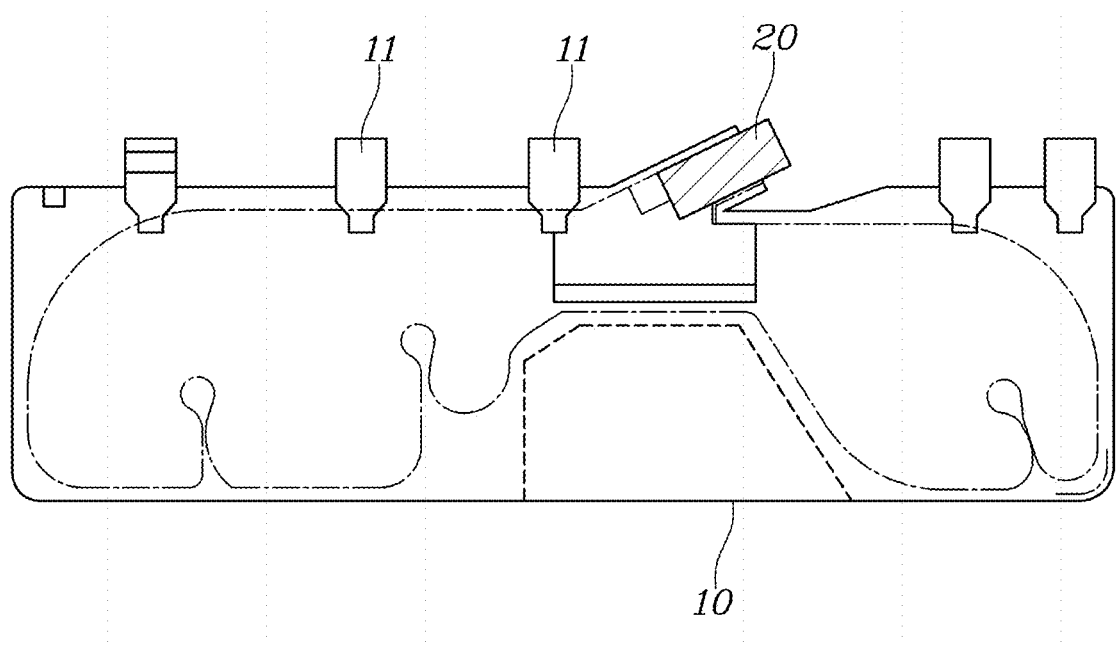
FIG. 1B is a view showing the state in which the general curtain airbag is deployed.
Figure 1C:
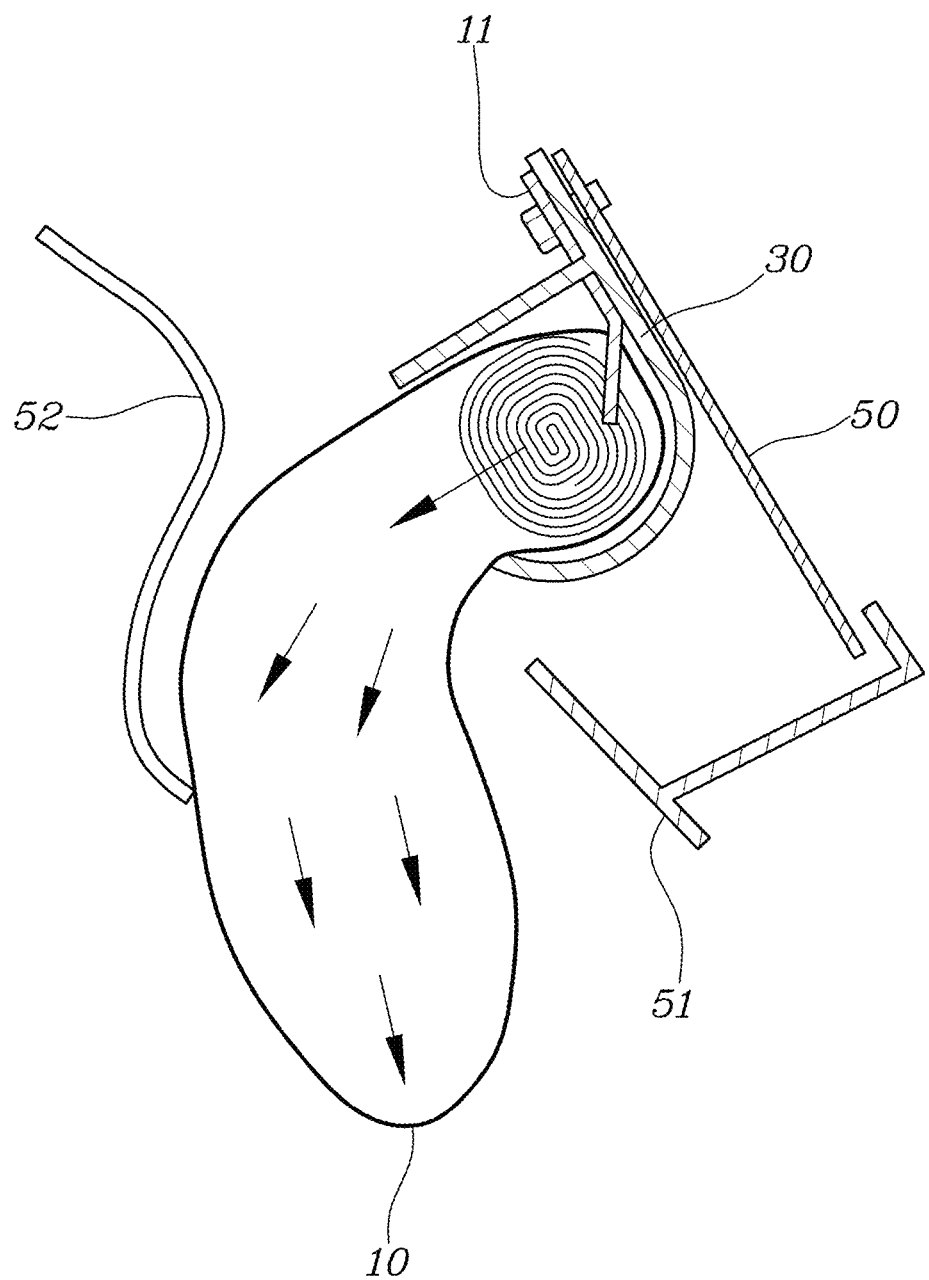
FIG. 1C is a view showing the process whereby the general curtain airbag is deployed.
Figure 2:
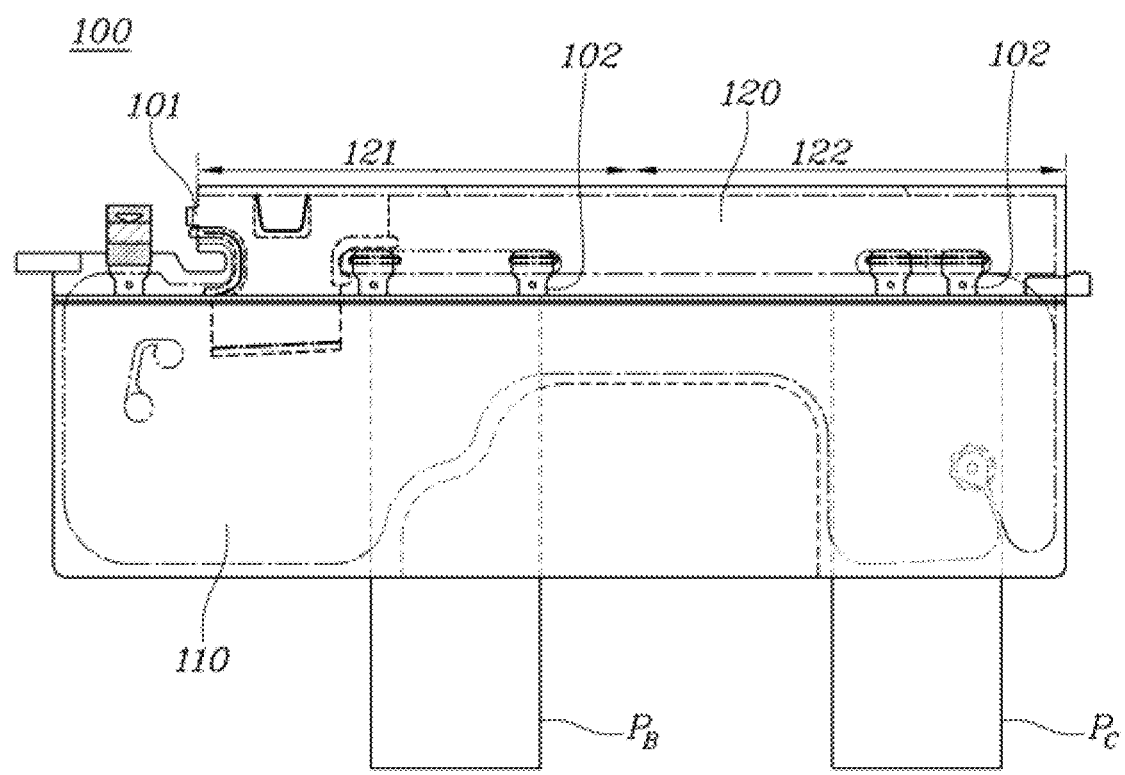
FIG. 2 is a view showing a deployed state of a curtain airbag according to an embodiment of the present invention.
Figure 3A:
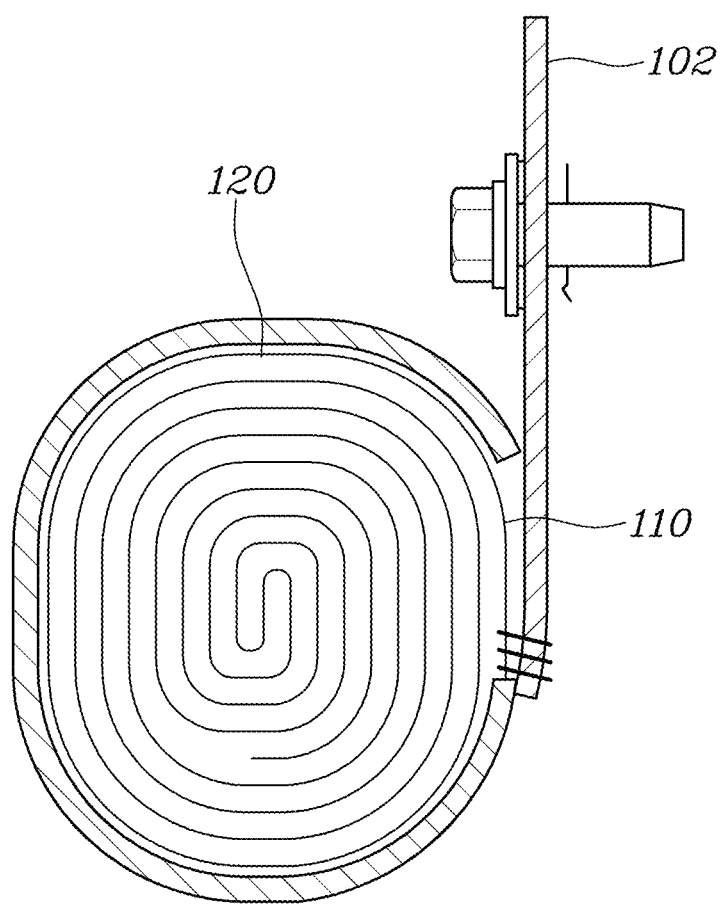
FIG. 3A is a view showing the state in which the curtain airbag according to the embodiment of the present invention is folded.
Figure 3B:
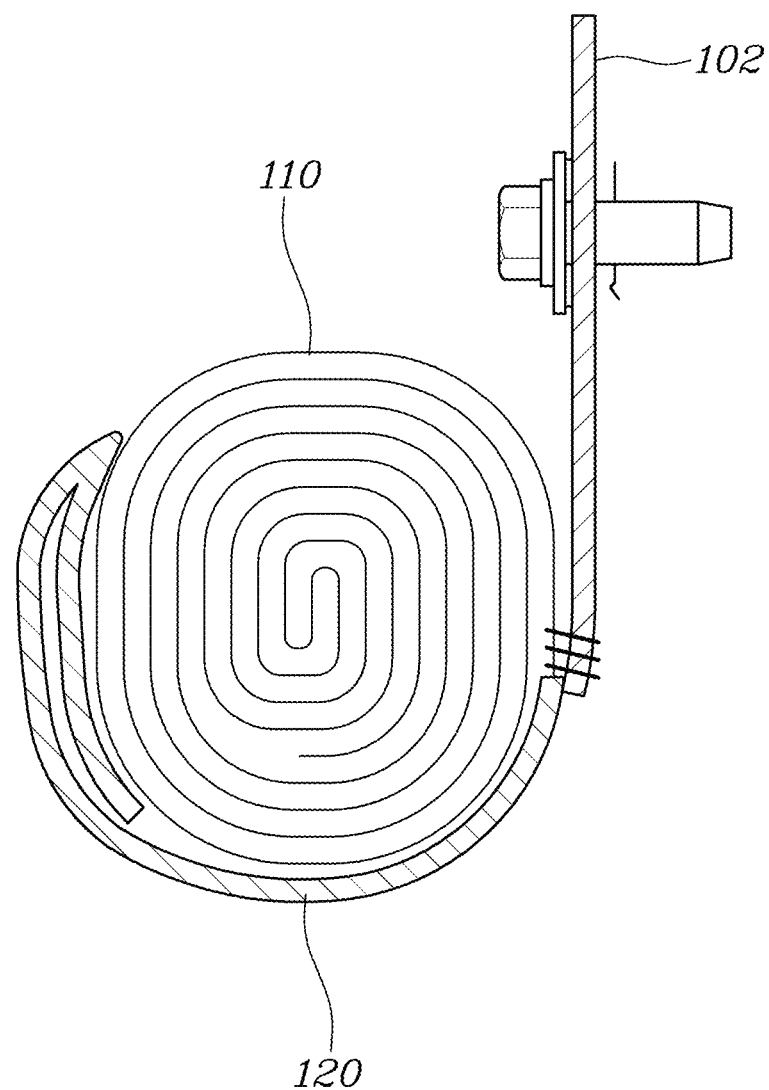
FIGS. 3B and 3C are views showing the state in which a curtain airbag according to another embodiment of the present invention is folded.
Figure 3C:
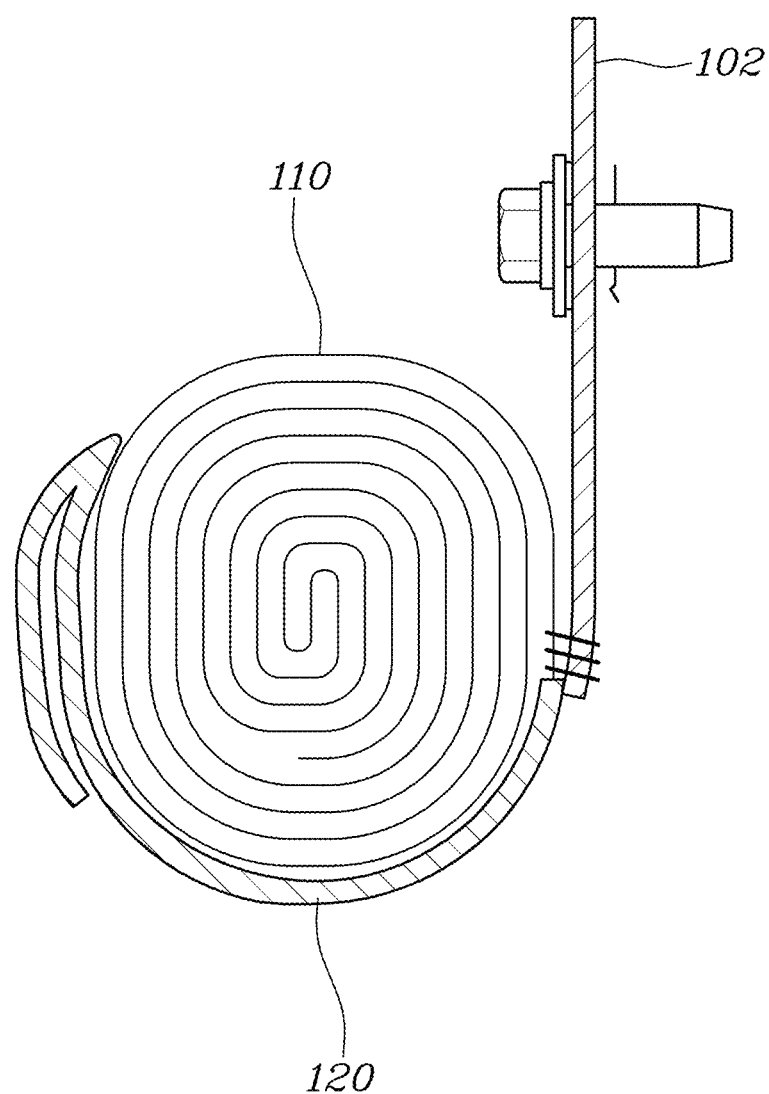

FIG. 2 is a view showing a deployed state of a curtain airbag according to an embodiment of the present invention, FIG. 3A is a view showing the state in which the curtain airbag according to the embodiment of the present invention is folded, and FIGS. 3B and 3C are views showing the state in which a curtain airbag according to another embodiment of the present invention is folded.

As shown in the drawing, a curtain airbag 100 according to the embodiment of the present invention is a device disposed at an upper side of a front door and a rear door of a vehicle in a forward-and-rearward direction of the vehicle so as to protect a side surface of a passenger sitting on a vehicle seat in the event of a vehicle accident. To this end, the curtain airbag 100 is elongated in the forward-and-rearward direction and is mounted in a space surrounded by an outboard member 50, a head liner 52, and a trim 51 forming a side portion of a vehicle body. More specifically, the curtain airbag 100 is elongated to extend from a rear end of an A-pillar (not shown) of the vehicle to a position where a C-pillar (PC) thereof is disposed via a B-pillar (PB) thereof, and is mounted therein.

The curtain airbag 100 will be described in detail. The curtain airbag according to the embodiment of the present invention includes a main cushion 110, provided at an upper side of the pillar of the vehicle along the forward-and-rearward direction of the vehicle and deployed upon inflation thereof, and a guide cushion 120, connected to a front area of an upper end portion of the main cushion 110 and configured to extend toward a rear of the vehicle, the guide cushion 120 pushing the main cushion 110 toward an inside of the vehicle while being inflated together with the main cushion 110.

The main cushion 110 is a means that is inflated so as to expand and be deployed beside the passenger. Further, the main cushion 110 is normally folded and rolled up, and is elongated to be stored in a space surrounded by the outboard member 50, the head liner 52, and the trim 51 of the vehicle along a longitudinal direction of the vehicle.

In this case, the main cushion 110 is mounted on the outboard member 50 of the vehicle via a plurality of mounting tabs 102.

In this case, the main cushion 110 is mounted on the outboard 50 of the vehicle via a plurality of mounting tabs 102.

Meanwhile, when the main cushion 110 is deployed, the guide cushion 120 is used as a means of guiding smooth inflation and deployment of the main cushion 110 without interfering with components forming a surrounding vehicle body such as the trim 30. Further, the guide cushion 120 is formed to be integrated with the main cushion 110.

For example, the guide cushion 120 is connected to the front area of the upper end portion of the main cushion 110 so that gas flows therebetween, and extends toward the rear of the vehicle. Therefore, while being inflated together with the main cushion 110, the guide cushion 120 pushes the main cushion 110 toward the inside of the vehicle at an initial stage of inflation.

Specifically, the guide cushion 120 is divided into a primary deployment area 121, which is connected to the main cushion 110 and is deployed in the outboard direction of the vehicle to push the main cushion 110 toward the inside of the vehicle, and a secondary deployment area 122, which is configured to extend from the primary deployment area 121 and to be deployed between an end portion of the trim 51 and the main cushion 110 to push the main cushion 110 so that the same does not contact the end portion of the trim 51.

In this case, the primary deployment area 121 and the secondary deployment area 122 of the guide cushion 120 are not divided by a specific unit, but are divided along the longitudinal direction in which the guide cushion 120 is deployed. The primary deployment area 121 corresponds to a portion connected to the main cushion 110, that is, a front area based on the longitudinal direction of the vehicle, and the secondary deployment area 122 corresponds to a rear area extending from the primary deployment area 121.

As described above, the guide cushion 120 is divided into the primary deployment area 121 and the secondary deployment area 122, and when gas is supplied to the inside of the guide cushion 120 and fills the same, it is preferable that the primary deployment area 121 be deployed earlier than the secondary deployment area 122.

To this end, a mounting hole 101 having the inflator 20 mounted therein is formed in the primary deployment area 121 of the guide cushion 120.

In addition, the main cushion 110 and the guide cushion 120 communicate with each other at a portion adjacent to the mounting hole 101. Therefore, the gas ejected from the inflator 20 flows to the main cushion 110 and the primary deployment area 121 of the guide cushion 120 while being distributed thereto.

In this case, it is preferable for a communication area where the main cushion 110 and the guide cushion 120 communicate with each other to be an area corresponding to an area where the B-pillar (PB) of the vehicle is located, or to be formed ahead of the aforementioned area toward the front of the vehicle. Therefore, the primary deployment area 121 of the guide cushion 120 and the secondary deployment area 122 thereof are sequentially inflated and deployed in that order.

Meanwhile, the main cushion 110 and the guide cushion 120 are formed by sewing edges of two sheets of fabric in the state in which the two sheets of fabric overlap each other. Therefore, the main cushion 110 and the guide cushion 120 are formed to be integrated with each other, but a specific gas path may be set by forming various sewing lines in consideration of the order in which the main cushion 110 and the guide cushion 120 are deployed and the shape thereof.

In this embodiment, as described above, it is preferable to allow the gas ejected from the inflator 20 to simultaneously flow to the main cushion 110 and the guide cushion 120 so that the primary deployment area 121 and the secondary deployment area 122 of the guide cushion 120 are sequentially deployed in an initial stage of deployment of the main cushion 110.

Meanwhile, the main cushion 110 and the guide cushion 120 are usually stored in a state of being folded into a roll shape.

Here, as shown in FIG. 3A, it is preferable that the guide cushion 120 be folded around the main cushion 110 in a shape surrounding the outside of the main cushion 110, which is folded and rolled up. Therefore, the guide cushion 120 is relatively earlier than the main cushion 110 in the initial stage of deployment of the main cushion 110 and the guide cushion 120, and, as such, the main cushion 110 is pushed toward the inside of the vehicle by the inflated and deployed guide cushion 120.

However, the shape in which the guide cushion 120 is folded around the main cushion 110 is not limited thereto, and the guide cushion 120 may be folded around the outside of the main cushion 110 in various ways.

For example, as shown in FIG. 3B, an end portion of the guide cushion 120 may be folded inwards toward the main cushion 110.

In addition, as shown in FIG. 3C, the end portion of the guide cushion 120 may be folded toward the inside of the vehicle.

Next, an embodiment of the process whereby the curtain airbag according to the embodiment of the present invention configured as described above is deployed will be described.

Figure 4A:
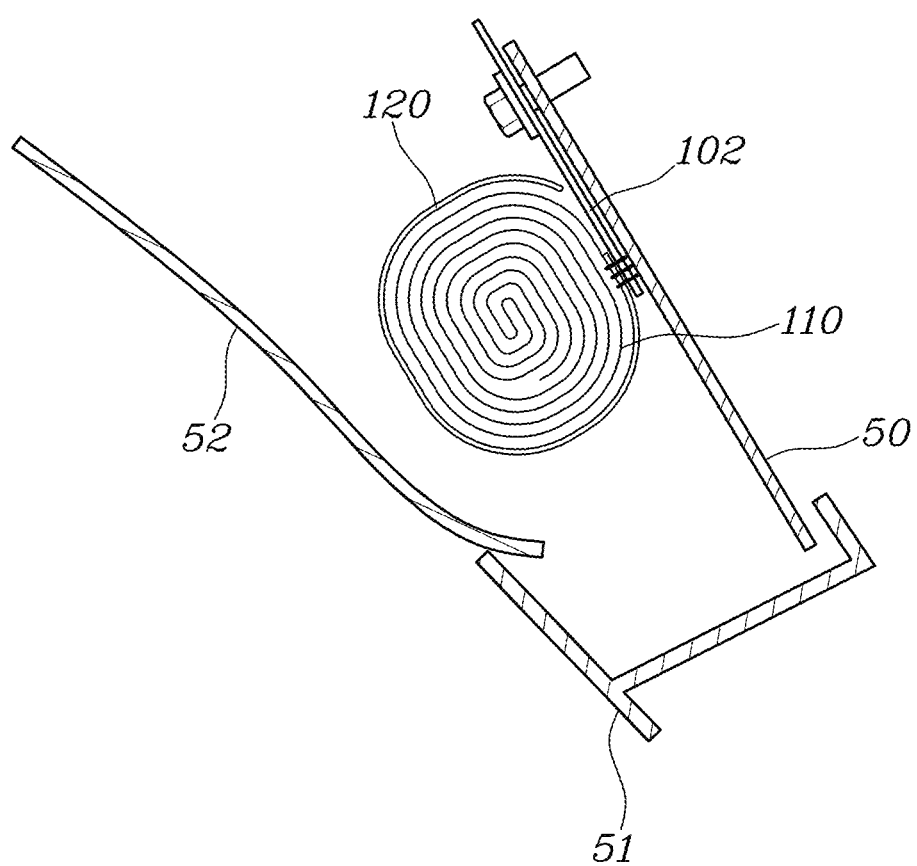
FIGS. 4A to 4C are views showing the process whereby the curtain airbag according to the embodiment of the present invention is deployed.
Figure 4B:
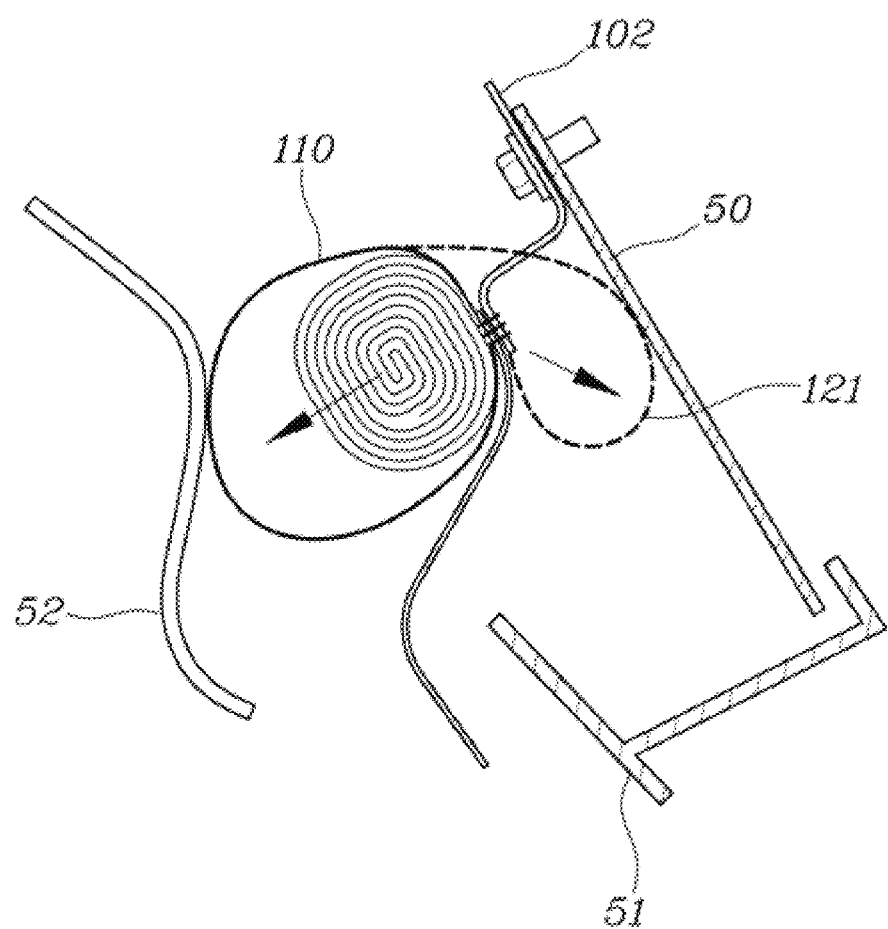
Figure 4C:
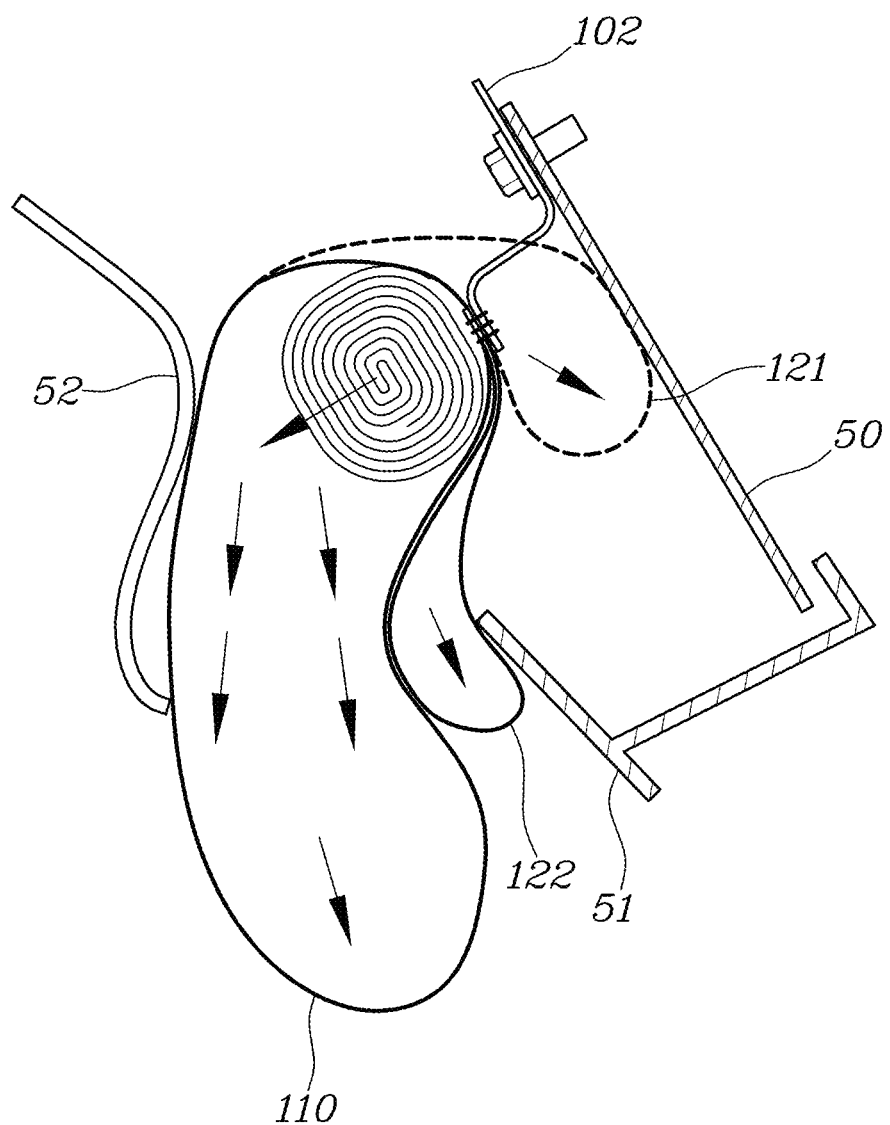

FIGS. 4A to 4C are views showing the process whereby the curtain airbag according to the embodiment of the present invention is deployed.

FIG. 4A is a view showing the state in which the curtain airbag is usually stored, and the main cushion 110 and the guide cushion 120 are folded together in a roll shape and stored in the space surrounded by the outboard member 50, the head liner 52, and the trim 51.

In this state, when an accident occurs, the inflator 20 is operated to eject gas. After that, the ejected gas inflates the primary deployment area 121 of the guide cushion 120 and simultaneously flows to the main cushion 110 to inflate the same.

Next, as shown in FIG. 4B, the primary deployment area 121 of the guide cushion 120 is first inflated and deployed. In this case, the primary deployment area 121 of the guide cushion 120 is inflated between the main cushion 110 and the outboard member 50 of the vehicle, and is deployed in a direction such that the main cushion 110 is pushed toward the inside of the vehicle.

Meanwhile, while the primary deployment area 121 of the guide cushion 120 is inflated, the main cushion 110 starts to be inflated. At this time, the secondary deployment area 122 of the guide cushion 120, folded around and surrounding the outside of the main cushion 110, is unfolded, and, as such, the secondary deployment area 122 thereof is located between the main cushion 110 and the trim 51.

In this state, when gas is continuously ejected from the inflator 20, as shown in FIG. 4C, the gas is inflated and deployed up to the secondary deployment area 122 of the guide cushion 120, and the deployed secondary deployment area 122 of the guide cushion 120 pushes away the main cushion 110, which is currently being deployed, from the trim 51.

Next, as the gas is continuously supplied to the main cushion 110, the main cushion 110 is completely deployed.

In this manner, the present invention allows the main cushion 110 to be deployed without interfering with the trim 51 by sequentially deploying the primary deployment area 121 and the secondary deployment area 122 of the guide cushion 120, thereby improving the deployability thereof. Particularly, in order to deploy the main cushion 110 while avoiding the trim 51, a separate component such as the ramp 30 of the related art is not necessary, thereby making it possible not only to reduce the cost of manufacturing the curtain airbag 100 but also to eliminate labor required for ramp assembly.

As is apparent from the above description, a guide cushion extending from a main cushion is provided to push the main cushion toward an inside of the vehicle at an initial stage of inflation of the main cushion, thereby improving reliability of deployment of the main cushion.

Particularly, since it is not necessary to include a component such as a ramp of the related art, which is a separate injection-molded plastic product, the component guiding a deployment direction of the main cushion, it is possible not only to reduce the cost of manufacturing the curtain airbag but also to eliminate labor required for ramp assembly, thereby improving productivity of the curtain airbag.

Although the present invention has been described with reference to the accompanying drawings and preferred embodiments, the present invention is not limited thereto, and is defined by the appended claims and their equivalents. Therefore, it will be appreciated by those skilled in the art that various modifications and changes can be made to these embodiments without departing from the spirit and scope of the invention as defined by the appended claims.

What is claimed is:

1. A curtain airbag comprising:
   a main cushion configured to be provided at an upper side of a pillar of a vehicle along a forward-and-rearward direction of the vehicle and configured to be deployed upon inflation thereof;
   a guide cushion connected to a front area of an upper end portion of the main cushion and configured to extend toward a rear of the vehicle, the guide cushion pushing the main cushion toward an inside of the vehicle while being inflated together with the main cushion, the guide cushion comprising:
      a primary deployment area connected to the main cushion and comprising a mounting hole with an inflator mounted therein, the primary deployment area being configured to be deployed toward an outboard member of the vehicle to push the main cushion toward the inside of the vehicle; and
      a secondary deployment area configured to extend from the primary deployment area and to be deployed between an end portion of a trim and the main cushion to push the main cushion to avoid contact with the end portion of the trim,
      the primary deployment area being configured to be deployed earlier than the secondary deployment area.

2. The curtain airbag according to claim 1, wherein:
   the main cushion is folded in a roll shape, and
   the guide cushion is folded around the main cushion in a shape surrounding an outside of the main cushion.

3. A curtain airbag comprising:
a main cushion configured to be provided at an upper side of a pillar of a vehicle along a forward-and-rearward direction of the vehicle configured to be deployed upon inflation thereof;
a guide cushion connected to a front area of an upper end portion of the main cushion and configured to extend toward a rear of the vehicle, the guide cushion pushing the main cushion toward an inside of the vehicle while being inflated together with the main cushion, the guide cushion comprising:
  a primary deployment area connected to the main cushion and configured to be deployed toward an outboard member of the vehicle to push the main cushion toward the inside of the vehicle; and
  a secondary deployment area configured to extend from the primary deployment area and to be deployed between an end portion of a trim and the main cushion to push the main cushion to avoid contact with the end portion of the trim,
wherein:
  a mounting hole, comprising an inflator mounted therein, is formed in the primary deployment area of the guide cushion, and
  the main cushion and the guide cushion communicate with each other at a portion adjacent to the mounting hole, and gas ejected from the inflator flows to the main cushion and the primary deployment area of the guide cushion while being distributed thereto.

4. The curtain airbag according to claim 3, wherein a communication area where the main cushion and the guide cushion communicate with each other is an area corresponding to an area where a B-pillar of the vehicle is located, or is formed ahead of the area where the B-pillar of the vehicle is located toward a front side of the vehicle.

* * * * *